Figure 1:
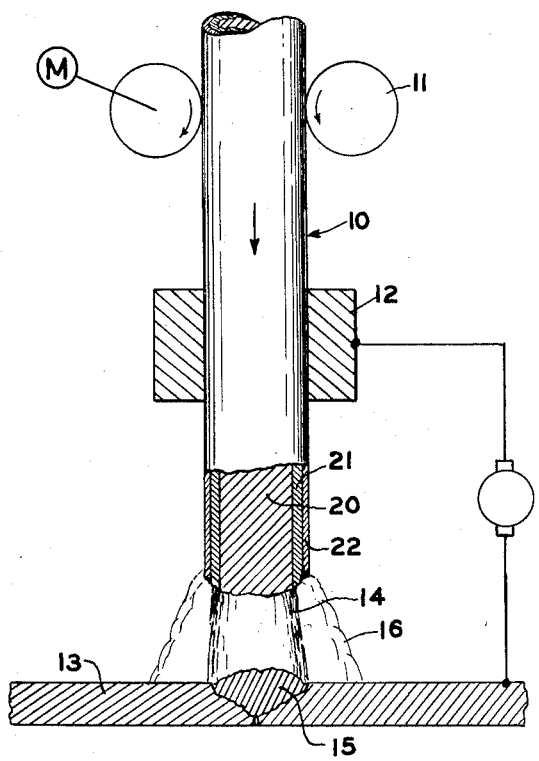

INVENTOR.
GEORGE G. LANDIS
JOHN E. CARROLL
BY
*Alfred C. Body*
ATTORNEY

United States Patent Office 2,909,648
Patented Oct. 20, 1959

2,909,648

METALLIC VAPOR SHIELDED ELECTRIC ARC WELDING

George G. Landis and John E. Carroll, South Euclid, Ohio, assignors to The Lincoln Electric Company, Cleveland, Ohio, a corporation of Ohio Application June 29, 1956, Serial No. 594,963

5 Claims. (Cl. 219—137)

This invention pertains to the art of electric arc welding and, more particularly, to means and method for shielding the arc from the atmosphere.

In the past numerous methods and arrangements have been employed to shield the electric arc from the atmosphere, all of which have had various difficulties which the present invention attempts to overcome.

For example, various non-metallic fluxing materials have been coated on a metal core wire. These materials either melt and/or vaporize in the heat of the arc to exclude the atmosphere and protect the deposited weld metal until it solidifies. Coated electrodes, while used extensively, have certain difficulties. They are relatively expensive to manufacture. They leave a slag on top of the weld bead which must be removed. Sometimes this slag clings tenaciously to the weld bead and is difficult to remove. In any event, it is messy. Furthermore, continuous or automatic welding has been practically impossible with coated electrodes. The coating is an electrical insulator and it has been difficult to energize the core wire through the coating. Thus the electrodes are made relatively short and the end opposite the arcing end is bared of coating and electrical contact is made on this end. The length of such an electrode is limited because of the heating effects of the electric current flowing through long lengths of the core wire for prolonged periods.

A granulated flux material has also been employed which is deposited as a windrow on the weld seam. A bare electrically energized electrode is advanced through this flux toward the workpiece and an arc is maintained underneath the flux. The flux serves the function of shielding the brilliant glare of the arc from the eyes of the operator as well as melting and vaporizing to protect the arc from the surrounding atmosphere. Using granulated flux, it is possible to use a bare electrode which is continually advanced toward the workpiece and only a small length of the electrode is carrying electric current at any one time.

The use of granulated flux is messy, expensive and requires the feeding of two distinct materials simultaneously to the arc; namely, the flux and the electrode.

The inert gases have also been employed to shield the arc from the effects of the atmosphere. These gases are flowed from storage tanks through flexible hoses to the tip of a welding gun which, in some cases, contains intricate wire feed mechanism. Particularly where such wire feed mechanism is built into the welding gun, it is conventional to employ water cooling to conduct away the radiated heat of the arc which would otherwise damage such mechanism. In any event, the storage tanks are themselves bulky and heavy. Additionally, the flexible hoses to feed the inert gas and the cooling water passages in the welding gun add to the bulk and complicatedness of an already bulky and complicated device. Further, the inert gases are relatively expensive.

Notwithstanding the above difficulty, inert gases have been used extensively in the non-ferrous and stainless steel arc welding field but only in limited application and under limited conditions in the low-alloy or no-alloy steel welding field.

More recently a method of shielding the arc from the atmosphere employing carbon dioxide gas has been developed, which method and means for carrying out the method are described in the co-pending application of George G. Landis and Eugene J. DeVal, filed March 1, 1955, Serial No. 491,518 and assigned to the assignee of this application. Such method and apparatus, while extremely effective, still require the use of a separate source of a shielding gas.

The present invention contemplates electric arc welding means and method which overcome all of the above-referred to difficulties and others, and enables a welding operation to be carried out by advancing an all metal welding electrode toward the workpiece as the electrode is consumed by the electric arc.

In accordance with the present invention, there is fed into the arc in appropriate amounts, along with the welding electrode, a metal or metals, each having the following characteristics: (1) a melting temperature less than the melting temperature of the parent metal of the electrode and the workpiece, (2) a boiling temperature less than the boiling temperature of the parent metal, and (3) a chemical inertness in the presence of nitrogen gas at or around the arc temperatures. Such metal or metals vaporize in the heat of the arc to exclude nitrogen from the vicinity of the arc and will be referred to hereafter jointly as "shielding metals." While the boiling temperature must be at least less than the boiling temperature, it is preferably substantially less than the boiling temperature of the parent metal.

For the arc welding of steel using a steel electrode, shielding metals satisfying the above requirements and, thus in accordance with the present invention, may be selected from the class consisting of: antimony, arsenic, bismuth, cadmium, cesium, cobalt, gold, indium, lead, palladium, rhodium, rubidium, scandium, silver, strontium, tellurium, thallium, tin and yttrium. Rare earths and radioactive materials which might also fall within this class have been omitted from this list. While nickel falls within the above general definition, its boiling temperature is so close to that of steel compared to the other metals listed as to be of no practical value.

Obviously, some of the metals listed are so rare and expensive as to be impractical in the electric arc welding of steel, and therefore can generally be excluded from the above list. These metals are cesium, gold, indium, palladium, rhodium, rubidium, scandium, strontium, thallium and yttrium.

Further, the vapors of some of the metals in the above list, as well as the finely divided airborne particles of their oxides, are considered toxic to varying degrees and when used usually the operator should be protected by exhausting the airborne waste products of the welding operation by using suitable ventilating systems. The metals which are considered toxic in varying degrees are: antimony, arsenic, cadmium, cobalt, lead and tellurium.

The amount of shielding metal employed, in accordance with the invention, is that which is sufficient to protect the welding arc by excluding the nitrogen of the atmosphere from coming in contact with the materials being transferred across the arc. Depending upon the shielding metal or medium employed, the amount of protective metal needed is from 4% to 10% of the weight of the electrode.

These shielding or vapor producing metals may be fed into the electric arc in any desired manner which will accomplish the desired objective of shielding the arc, such as but not limited to: coating the vapor producing metal on the electrode by plating, dipping or wrapping, or feeding the vapor producing metal into the arc separately from the electrode as a powder or wire. Preferably, the vapor producing metal is coated on the parent metal of the welding electrode.

Further in accordance with the invention, and particularly for the welding of steel and its alloys, a de-oxidizer is fed into the arc simultaneously with the parent metal of the electrode and the vapor producing metal. Such de-oxidizer should have the following characteristics: (1) a melting temperature less than or just slightly in excess of the melting temperature of steel, (2) a boiling temperature greater than the melting temperature of steel, and (3) a greater affinity for oxygen than does either carbon or iron. By affinity is meant the attraction of one element for another to react therewith and form a compound. The relative affinity a particular element has for oxygen can be predetermined if the free energy of the oxide of that element is known. In general, the lower the free energy per mole of oxygen, the greater affinity that element has for oxygen. The values for these free energies are reported in the literature.

For the welding of steel, de-oxidizers falling within the above limitations are: hafnium, lanthanum and the metals of the lanthanide series, zirconium, yttrium, scandium, beryllium, aluminum, titanium, and silicon.

These de-oxidizers may be fed into the arc in any desired manner, such as, wrapping or coating the de-oxidizers if it is electrically conductive on the outer surface of the electrode and preferably below the vapor producing metal, by alloying the de-oxidizer with the electrode metal, by feeding the de-oxidizer into the arc separately either as a solid material or as a powder or by feeding the de-oxidizer interspersed with the metal of the electrode, or in an interior cavity thereof.

By using such de-oxidizers in proper amounts and a vapor producing metal as above indicated, solid non-porous welds can be successfully obtained while welding in air; that is, without any other means for excluding the atmosphere from the vicinity of the arc.

Without desiring to limit the invention, its success is believed based upon the following theory of operation: Most of the elements, and particularly the metals and carbon all have an affinity for oxygen in varying degrees and will react therewith under certain conditions to form an oxide. Certain of these elements have sufficiently greater affinity for oxygen than others so as, in the presence of heat and oxides of elements of lower affinity, to reduce such oxide to its element and, in turn, forming an oxide of the higher affinity element.

One of the causes of porosity in a deposited steel weld bead is due to the element carbon which is present in all steels and the compound, iron oxide, which is present as inclusions in all steels which are of the unkilled type, or on the surface of killed type steels which have been in storage sufficiently long to have a rust coating form on the surface. Most steels to be welded and almost all electrode steels are of the "unkilled" type. Also, in the welding of steels if air comes in contact with the molten metal, an iron oxide film is formed on the surface.

In the heat of the arc, the carbon which has a higher affinity for oxygen than does iron reduces the iron oxide to form elemental iron and carbon monoxide (also sometimes carbon dioxide) a gas with a volume many thousands of times greater than the volume of the two elements from which it is formed. This carbon monoxide is formed internally of the molten weld bead and is trapped therein as the metal congeals leaving holes or bubbles throughout the weld bead.

The de-oxidizers above set forth, which are fed to the weld pool, along with the electrode, all have a greater affinity for oxygen than does either iron or carbon and will reduce any iron oxide present to the exclusion of carbon to form elemental iron and an oxide of the de-oxidizer. As long as there is sufficient de-oxidizer present to react with all of the iron oxide, no carbon monoxide will be formed. The oxides of these de-oxidizers are either liquid or solid at the molten temperature of iron and either float on the top of the molten weld bead where they may be disposed of as a slag, or will be dispersed throughout the hardened weld metal and no harm results.

However, these de-oxidizers all have an affinity for nitrogen and will thus react with nitrogen of the air to form a nitride of the metal if the nitrogen is not excluded from the vicinity of the weld. In accordance with the present invention, the vapor producing metal continuously forms a cloud of a metal vapor around the arc to exclude the atmosphere and/or combine with the oxygen of the atmosphere. These metals do not combine with nitrogen of the atmosphere to form a nitride which might be carried into the arc.

Further in accordance with the invention, a welding electrode is provided comprised of a steel core having either alloyed, mixed with, or coating the outer surface thereof, a metal selected from the class consisting of hafnium, lanthanum and the metals of the lanthanide series, zirconium, yttrium, scandium, beryllium, aluminum, titanium, boron and silicon, and the ferro alloys thereof and an outer coating of a metal having a melting temperature less than the melting temperature of steel, a boiling temperature less than the boiling temperature of steel, a chemical inertness in the presence of nitrogen at arc temperatures which may be selected from the class consisting of antimony, arsenic, bismuth, cadmium, cesium, cobalt, lead, silver, strontium, tellurium and tin.

The principal object of the invention is the provision of a new and improved method and means for electric arc welding wherein an all-metal electrode may be employed without the need for other means to exclude the atmosphere from the arc or weld zone.

Another object of the invention is a new and improved method of electric arc welding using a metal vapor for the purpose of shielding the electric arc from the atmosphere.

Still another object of the invention is the provision of a new and improved electric arc shielding arrangement.

Another object of the invention is to provide a new and improved method and means for electric arc welding which does not require the use of non-metallic flux materials or inert gas shields.

Figure 2:
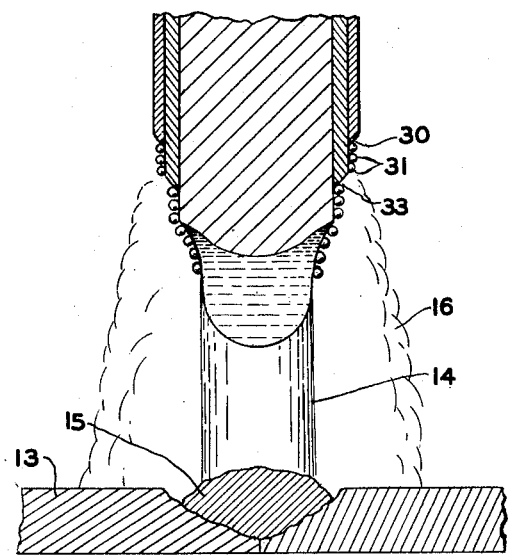

The invention may take physical form in certain electrode metals of a desired parent metal in combination with other metals which perform the desired shielding of the electric arc and in certain steps and combinations of steps, preferred embodiments of which will be described in detail in this specification and illustrated in the accompanying drawing which is a part hereof and wherein:

Figure 1 shows somewhat schematically arc welding apparatus using a consumable electrode constructed in accordance with the present invention, and Figure 2 shows somewhat pictorially the method of operation of the electrode.

Referring now to the drawings, wherein the showing is for the purposes of illustrating a preferred embodiment of the invention only, and not for the purposes of limiting same: Figure 1 shows an arc welding electrode indicated generally at 10 being continuously advanced by a pair of electrode feed rolls 11 through an electrically energized electrode nozzle 12, toward a workpiece 13. An arc 14 is maintained between the end of the electrode 10 and a workpiece 13, this arc and the weld pool 15 on the workpiece 13 being protected by a cloud of metallic vapor 16 in accordance with the invention and as will appear.

The electrode 10 is comprised generally of an inner core 20, a first layer 21 of a de-oxidizing material and a second or outer layer 22 of a metal or metals capable of producing a shield of metallic vapor about the arc 14 and the weld zone 15.

The core 20 preferably has a solid cross-section and is formed of the metal which it is desired to deposit in the weld bead which, for the welding of steel, will be ordinarily low-carbon, low-alloy steel. Obviously, if the non-ferrous metals are to be welded, the electrode will be formed of such non-ferrous metals as are necessary to effect the weld.

The coating or layer 21 is preferably aluminum in an amount equal to 1% of the weight of the core 20. Obviously, more or less than this amount can be employed in amounts of from ½% to 2% of the weight of the core 20. The lower amounts may be successfully employed where the welding is to be conducted on semi-killed or killed steels and where the surface of the workpiece is clean at the start of the welding operation. The higher amounts should be employed where the workpiece and/or the core has substantial amounts of iron oxide inclusions or the surface of the workpiece to be welded is rusty or the like.

Obviously, the metal of the layer 21 can be other metals capable of performing a de-oxidizing action on steel, such metals being selected from class consisting of hafnium, lanthanum and the metals of the lanthanide series, zirconium, yttrium, scandium, beryllium, aluminum, titanium, boron and silicon.

Such metals may be employed in amounts proportionate to their de-oxidizing action; that is, those metals with the lower affinity for oxygen will have to be employed in greater amounts than those with a higher affinity for oxygen. If silicon is employed, it should be employed in amounts of from 1% to 2%.

The de-oxidizing material, either silicon, aluminum or the others named, may be applied to the core 20 in other ways than a surface layer thereon. Thus, the aluminum, silicon and the others may be alloyed with the steel core, or may be incorporated in the steel core as a powder such as by making the core 20 a hollow tube as is explained in greater detail in application Serial No. 594,918, filed June 29, 1956, in the name of George G. Landis and Donald M. Patton and assigned to the assignees of this application.

It should be noted that silicon, if employed as a de-oxidizer, could be alloyed with the steel of the core. Steel with silicon alloy in the amounts indicated is relatively expensive and is, therefore, not preferred although not excluded from the invention.

The layer 22 in the preferred embodiment is preferably the element cadmium in an amount such that when vaporized, it will shield the arc from the atmosphere and, in the preferred embodiment, has a weight of approximately 5% of the weight of the steel core. Obviously, this weight of cadmium may be varied within limits of from between 4% to 10% of the weight of the steel core. If insufficient cadmium is employed, proper shielding of the arc will not result. If an excess of cadmium is employed, the amount is wasted.

Alternatively, the coating or layer 22 may consist of one or more of the following metals selected from the class consisting of antimony, arsenic, bismuth, cesium, cobalt, gold, indium, lead, palladium, rhodium, rubidium, scandium, silver, strontium, tellurium, folium, tin and yttrium.

Such metals may be used either singly or in combination; thus, a coating made up of an alloy of tin, bismuth and cadmium in the following ratios

|  | Percent |
| --- | --- |
| Tin | 4 |
| Bismuth | ¾ |
| Cadmium | ½ | is satisfactory.

The layer 22 may be placed on the surface of the core 20 in any desired manner such as electroplating, dipping or the like. Dipping is preferred.

It is to be noted that if a series of vapor producing metals are to be employed to make up the layer 22, they may be progressively added in order of their melting temperatures, the element having the highest melting temperature being applied first and the element having the lowest melting temperature being applied last. Using such an arrangement, it is possible to build up thicker coatings of vapor producing metals than is possible when only a single vapor producing element is employed.

While various dimensions of the core 10 may be employed in accordance with the invention, it is preferred that the electrode have a diameter of between 3/32 and 1/8 inch. Obviously, however, the electrode diameter may vary as desired.

In operation, the electrode is advanced like any other bare metal electrode from a remotely located reel through electrode feed rolls past an electrically energized contact block toward the workpiece and an arc is continuously maintained between the electrode and the workpiece. The core 10 which being of steel, melts at a temperature of about 1535° C. is rapidily brought to the melting temperature as it moves toward the arc by heat radiated from the arc, by the $I^2R$ heating of the metal and by heat conducted upwardly from the end through the metal. Thus portions of the core 20 spaced from the arcing end are heated to elevated temperatures. The layers 21, 22 are likewise heated to elevated temperatures. The layer 22 reaches the melting temperature first as at 30 and immediately changes into droplets 31 on the surface of the electrode. These droplets continue to be heated by heat radiated from the arc and almost immediately boil into a vaporous cloud of metal vapor. The evolution of this vapor is extremely rapid and a continually supplied stream of shielding metal vapor is provided which is projected about the arc and by the velocity of the gas formed excludes the atmosphere from the vicinity of the arc. Obviously, some of the metal vapor will react with the oxygen of the atmosphere to form an oxide of the metal, which oxide also is a gas and serves to also protect the arc from the atmosphere. The metal vapor does not react with the arc from the atmospher. The metal vapor does not react with the nitrogen of the air.

At the point 33, which is somewhat closer to the arcing end of the electrode than the point 30, the de-oxidizing metal is also melted. This de-oxidizing metal has a boiling temperature substantially greater than the melting temperature of steel and is thus carried into the molten weld pool as a liquid. In the event the de-oxidizer does vaporize in a manner similar to that of the vapor producing metal, it will condense upon falling into the molten weld pool where it can then perform its de-oxidizing action. Such de-oxidizing action is to immediately reduce any iron oxide with which it comes in contact to elemental iron and an oxide of the de-oxidizer. The oxides of these de-oxidizers are either liquids or solids at the molten temperature of steel and thus either float to the surface of the molten weld pool where they may be slagged away or remain as minute inclusions in the hardened weld metal where they do no harm.

It is to be noted that many of the de-oxidizers mentioned have an affinity for nitrogen and react therewith to form a nitride which is carried into the molten weld pool either as a gas or as a liquid or solid. If the nitride is a gas at the molten temperature of steel, porosity will result. Alternatively, the metal of some nitrides, such as aluminum or silicon, when carried into the weld bead, has a greater affinity for oxygen than they do for nitrogen and combine with the oxygen of the iron oxides to produce elemental iron and nitrogen gas which is trapped within the molten weld metal and causes porosity.

As pointed out above, however, the vapor producing metal, be it cadmium, tin, or the like, continuously produces a gas as the electrode is advanced into the arc of sufficient volume to exclude nitrogen and oxygen from the arc, the molten weld metal and the de-oxidizing metal.

The invention has been described with reference to a steel core which is generally round. It will be appreciated that the electrode could have any other desired shape; for example, a flat ribbon, a tube, a flat ribbon folded upon itself, or the like.

While the amount of metal employed for producing the metallic vapor may be anything above a critical minimum amount necessary to effectuate the shielding, e.g. 4%, it is believed that the maximum amount is approximately 10%, such limitation being a practical one rather than a technical limitation. The invention is not in all cases limited to the 4% minimum for the vapor producing metal, however.

The invention has been described with reference to preferred embodiment. Obviously, modifications and alterations will occur to others upon reading and understanding of this specification and it is my intention to include all such modifications and alterations insofar as they come within the scope of the appended claims, or the equivalent thereof.

Having thus described our invention, we claim:

1. A method of electric arc welding a steel workpiece comprising advancing an electrically energized steel electrode toward the workpiece while maintaining an arc between the end of the electrode and the workpiece, and simultaneously feeding one or more metals selected from the class consisting of bismuth, cobalt, silver, tin and cadmium to the arc in an amount of between 5 and 10% of the weight of the steel electrode, such metal vapor producing metals being introduced externally of the steel electrode.

2. A method of electric arc welding a steel workpiece comprising advancing an electrically energized steel electrode toward a steel workpiece while maintaining an arc between the end of the electrode and the workpiece, and simultaneously feeding into such arc one or more de-oxidizing metals selected from the class consisting of aluminum and silicon in amounts of from ½ to 4% and a metal vapor producing metal selected from the class consisting of bismuth, cobalt, silver, tin and cadmium in amounts in excess of about 5%, such metal vapor producing metals being introduced externally of the steel electrode.

3. A welding electrode for use in electric arc welding of steel, said electrode being comprised of steel in amounts of from about 85 to 95%, a de-oxidizing metal selected from the class consisting of aluminum or silicon in amounts of from ½ to 4% and one or more metal vapor producing metals selected from the class consisting of bismuth, cobalt, silver, tin and cadmium in amounts of from 5 to 10%, such metal vapor producing metals being introduced externally of the steel electrode.

4. A welding electrode comprised of a steel core, a coating of aluminum in an amout of from ½ to 4% of the weight of the steel and a further coating of one or more metals selected from the class consisting of bismuth, cobalt, silver, tin and cadmium in amounts of from 5 to 10% of the weight of the steel, such metal vapor producing metals being introduced externally of the steel electrode.

5. A welding electrode for use in the welding of steel using an electric arc comprising in combination a steel core having a weight of between 85 and 95% of the total and having alloyed therewith, aluminum and/or silicon in amounts of from ½ to 4% and having coated thereon one or more metals selected from the class consisting of bismuth, cobalt, silver, tin and cadmium in amounts of from 5 to 10%.

References Cited in the file of this patent

UNITED STATES PATENTS

| | | |
|---|---|---|
| 1,501,266 | Brace | July 15, 1924 |
| 2,023,364 | Crapo | Dec. 3, 1935 |
| 2,123,571 | Lessel | July 12, 1938 |
| 2,317,421 | Tholand | Apr. 27, 1943 |